US012072087B2

(12) United States Patent
Hamid et al.

(10) Patent No.: US 12,072,087 B2
(45) Date of Patent: Aug. 27, 2024

(54) LAMP ASSEMBLY WITH THERMAL TRANSPORTER

(71) Applicant: Flex-N-Gate Advanced Product Development, LLC, Tecumseh (CA)

(72) Inventors: Muhammed Aquil Hamid, Canton, MI (US); Steven Barman, Canton, MI (US); Charles F. Schweitzer, Livonia, MI (US); Chirag Hiremath, Detroit, MI (US)

(73) Assignee: Flex-N-Gate Advanced Product Development, LLC, Tecumseh (CA)

( * ) Notice: Subject to any disclaimer, the term of this patent is extended or adjusted under 35 U.S.C. 154(b) by 0 days.

(21) Appl. No.: 17/879,517

(22) Filed: Aug. 2, 2022

(65) Prior Publication Data

US 2023/0083673 A1 Mar. 16, 2023

Related U.S. Application Data

(63) Continuation of application No. 15/756,422, filed as application No. PCT/US2016/049754 on Aug. 31, 2016, now Pat. No. 11,402,091.

(Continued)

(51) Int. Cl.

| | |
|---|---|
| ***F21V 29/87*** | (2015.01) |
| ***F21S 43/14*** | (2018.01) |
| ***F21S 43/19*** | (2018.01) |
| ***F21S 43/27*** | (2018.01) |
| ***F21S 45/10*** | (2018.01) |
| ***F21S 45/47*** | (2018.01) |
| ***F21S 45/48*** | (2018.01) |

(Continued)

(52) U.S. Cl.

CPC .............. *F21V 29/87* (2015.01); *F21S 43/14* (2018.01); *F21S 43/19* (2018.01); *F21S 43/27* (2018.01); *F21S 45/10* (2018.01); *F21S 45/47* (2018.01); *F21S 45/48* (2018.01); *F21V 5/00* (2013.01); *F21Y 2115/10* (2016.08)

(58) Field of Classification Search

CPC .................................. F21S 45/48; F21S 45/47

See application file for complete search history.

(56) References Cited

U.S. PATENT DOCUMENTS

| | | | | |
|---|---|---|---|---|
| 10,591,124 | B2 * | 3/2020 | Kushalappa .......... | F21S 41/151 |
| 2007/0025105 | A1 | 2/2007 | Inoue | |

(Continued)

FOREIGN PATENT DOCUMENTS

| | | |
|---|---|---|
| JP | 2012-076958 A | 4/2012 |

OTHER PUBLICATIONS

International Searching Authority, International Search Report, PCT/US2016/049754, Dated Nov. 29, 2016.

(Continued)

*Primary Examiner* — Andrew J Coughlin

(74) *Attorney, Agent, or Firm* — Reichel Stohry Dean LLP; Mark C. Reichel; Natalie J. Dean

(57) ABSTRACT

Lamp assembly with thermal transporter. The present disclosure includes disclosure of a lamp assembly, comprising a housing; a cover attached to the housing defining a volume; a light source disposed within the volume; and a thermal transporter in thermal communication with the light source; wherein the thermal transporter comprises a plurality of graphite sheets structured to transfer heat generated by the light source away from the light source.

19 Claims, 7 Drawing Sheets

Related U.S. Application Data

(60) Provisional application No. 62/212,209, filed on Aug. 31, 2015.

(51) Int. Cl.
*F21V 5/00* (2018.01)
*F21Y 115/10* (2016.01)

(56) References Cited

U.S. PATENT DOCUMENTS

| | | | |
|---|---|---|---|
| 2007/0053168 | A1 | 3/2007 | Sayir et al. |
| 2008/0158876 | A1 | 7/2008 | Thraikill |
| 2008/0247177 | A1 | 10/2008 | Tanaka et al. |
| 2009/0278461 | A1 | 11/2009 | Lee |
| 2010/0103667 | A1 | 4/2010 | Thrailkill |
| 2011/0133236 | A1 | 6/2011 | Nozaki et al. |
| 2012/0307501 | A1 | 12/2012 | Tankala |
| 2014/0063289 | A1 | 3/2014 | Kushalappa |
| 2015/0036369 | A1 | 2/2015 | Kim |
| 2015/0221823 | A1 | 8/2015 | Hwang |
| 2015/0308649 | A1 | 10/2015 | Chen |
| 2016/0312978 | A1 | 10/2016 | Park |
| 2016/0319999 | A1 | 11/2016 | Elzinga |
| 2017/0167716 | A1 | 6/2017 | Ezaki |
| 2018/0085977 | A1 | 3/2018 | Ezaki |
| 2018/0159008 | A1 | 6/2018 | Fan et al. |

OTHER PUBLICATIONS

International Searching Authority, Written Opinion of the International Searching Authority, PCT/US2016/049754, Dated Nov. 29, 2016.

* cited by examiner

LAMP ASSEMBLY WITH THERMAL TRANSPORTER

PRIORITY

The present disclosure is related to, claims the priority benefit of, and is a U.S. continuation patent application of, U.S. patent application Ser. No. 15/756,422, filed Feb. 28, 2018 and issued as U.S. Pat. No. 11,402,091 on Aug. 2, 2022, which is related to, claims the priority benefit of, and is a U.S. national stage patent application of, PCT Patent Application Serial No. PCT/US2016/049754, filed Aug. 31, 2016, which is related to, and claims the priority benefit of, U.S. Provisional Patent Application Ser. No. 62/212,209, filed Aug. 31, 2015, the contents of which are hereby incorporated into the present disclosure in their entirety.

BRIEF SUMMARY

According to one aspect of the present disclosure, a lamp assembly includes a thermal transporter in thermal communication with a light source. The thermal transporter is structured to transfer heat from the light source to a relatively cool portion of the lamp assembly. In one embodiment, the thermal transporter may be structured to transfer heat from the light source to a relatively cool region external to the lamp assembly. The thermal transporter may be comprised of a plurality of graphite sheets exhibiting a relatively high thermal conductivity in a plane substantially parallel with the graphite sheets and a relatively low thermal conductivity in a direction substantially perpendicular with the plane. In at least one embodiment, the light source is a light-emitting diode mounted to a circuit board in thermal communication with the thermal transporter.

The present disclosure includes disclosure of a lamp assembly, comprising a housing; a cover attached to the housing defining a volume; a light source disposed within the volume;

and a thermal transporter in thermal communication with the light source; wherein the thermal transporter comprises a plurality of graphite sheets structured to transfer heat generated by the light source away from the light source.

The present disclosure includes disclosure of a lamp assembly, wherein the plurality of graphite sheets exhibit a relatively high thermal conductivity in a plane substantially parallel with the graphite sheets and a relatively low thermal conductivity in a direction substantially perpendicular with the plane.

The present disclosure includes disclosure of a lamp assembly, wherein the light source is a light-emitting diode.

The present disclosure includes disclosure of a lamp assembly, wherein the light source comprises a plurality of light-emitting diodes.

The present disclosure includes disclosure of a lamp assembly, wherein the thermal transporter is further structured to dissipate the transferred heat to a relatively cool portion of the volume.

The present disclosure includes disclosure of a lamp assembly, wherein the thermal transporter comprises a proximal end in thermal contact with the light source and a distal end extending into the relatively cool portion of the volume.

The present disclosure includes disclosure of a lamp assembly, wherein the lamp assembly further comprises a circuit board in thermal contact with the thermal transporter, wherein the light-emitting diode is attached to the circuit board.

The present disclosure includes disclosure of a lamp assembly, wherein the lamp assembly further comprises a carrier connected to the thermal transporter opposite the light source.

The present disclosure includes disclosure of a lamp assembly, wherein the plurality of graphite sheets are graphene layers, substantially parallel to one another and expanded by intercalation and exfoliation.

The present disclosure includes disclosure of a lamp assembly, configured as an automotive lamp assembly.

The present disclosure includes disclosure of a lamp assembly, configured as an automotive headlamp.

The present disclosure includes disclosure of a lamp assembly, wherein the cover comprises a lens configured to allow light from the light source to travel therethrough.

The present disclosure includes disclosure of a lamp assembly, wherein the light source comprises a plurality of light-emitting diodes, and wherein at least two of the plurality of light-emitting diodes comprise different colors.

The present disclosure includes disclosure of a lamp assembly, wherein the light source comprises at least one light-emitting diode comprising a die coupled to a slug.

The present disclosure includes disclosure of a lamp assembly, wherein the thermal transporter is coupled to the slug.

The present disclosure includes disclosure of a lamp assembly, wherein the thermal transporter is in thermal communication with the slug.

The present disclosure includes disclosure of a lamp assembly, wherein the thermal transporter is coupled to the light source.

The present disclosure includes disclosure of a lamp assembly, wherein each graphite sheet of the plurality of graphite sheets comprises a plurality of graphene sheets.

The present disclosure includes disclosure of a lamp assembly, wherein a space exists between each of the plurality of graphene sheets.

The present disclosure includes disclosure of a lamp assembly, further comprising intercalation ions positioned in between at least two graphene sheets of the plurality of graphene sheets.

The present disclosure includes disclosure of a lamp assembly, wherein the thermal transporter defines a proximal end in thermal communication with the light source and a distal end away from the light source.

The present disclosure includes disclosure of a lamp assembly, wherein spaces exist between each graphene sheet of the plurality of graphene sheets.

The present disclosure includes disclosure of a lamp assembly, wherein the spaces are uniform between each graphene sheet of the plurality of graphene sheets.

The present disclosure includes disclosure of a lamp assembly, wherein the spaces are smaller between each graphene sheet of the plurality of graphene sheets at the proximal end of the thermal transporter and are relatively larger between each graphene sheet of the plurality of graphene sheets at the distal end of the thermal transporter.

The present disclosure includes disclosure of a lamp assembly, wherein the thermal transporter comprises a body portion and at least one leg portion, the body portion positioned at a proximal end of the thermal transporter and configured for placement at or near the light source so to be in thermal communication with the light source, and the at least one leg portion extending from the body portion to a distal end of the thermal transporter, the distal end located away from the light source.

The present disclosure includes disclosure of a lamp assembly, comprising a light source comprising at least one light-emitting diode; and a thermal transporter in thermal communication with the light source, the thermal transporter having a proximal end at or near the light source and a distal end away from the light source, the thermal transporter comprising a plurality of graphite sheets structured to transfer heat generated by the light source to the distal end of the thermal transporter away from the light source.

The present disclosure includes disclosure of a lamp assembly, configured to fit within a housing having a lens attached thereto, the housing configured as a lamp housing.

The present disclosure includes disclosure of a lamp assembly, wherein each graphite sheet of the plurality of graphite sheets comprises a plurality of graphene sheets.

The present disclosure includes disclosure of a lamp assembly, wherein a space exists between each of the plurality of graphene sheets.

The present disclosure includes disclosure of a lamp assembly, further comprising intercalation ions positioned in between at least two graphene sheets of the plurality of graphene sheets.

The present disclosure includes disclosure of a lamp assembly, wherein the thermal transporter defines a proximal end in thermal communication with the light source and a distal end away from the light source.

The present disclosure includes disclosure of a lamp assembly, wherein spaces exist between each graphene sheet of the plurality of graphene sheets.

The present disclosure includes disclosure of a lamp assembly, wherein the spaces are uniform between each graphene sheet of the plurality of graphene sheets.

The present disclosure includes disclosure of a lamp assembly, wherein the spaces are smaller between each graphene sheet of the plurality of graphene sheets at the proximal end of the thermal transporter and are relatively larger between each graphene sheet of the plurality of graphene sheets at the distal end of the thermal transporter.

The present disclosure includes disclosure of a lamp assembly, wherein the thermal transporter comprises a body portion and at least one leg portion, the body portion positioned at a proximal end of the thermal transporter and configured for placement at or near the light source so to be in thermal communication with the light source, and the at least one leg portion extending from the body portion to a distal end of the thermal transporter, the distal end located away from the light source.

The present disclosure includes disclosure of a method of dissipating heat generated by a light source, the method comprising the step of positioning a thermal transporter in thermal communication with a light source, the thermal transporter comprising a plurality of graphite sheets structured to transfer heat generated by the light source away from the light source during operation of the light source; and operating the light source to generate light and the heat.

The present disclosure includes disclosure of a method of dissipating heat generated by a light source, wherein the thermal transporter and the light source are positioned within a lamp assembly comprising a housing and a cover attached thereto.

This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DETAILED DESCRIPTION

Figure 1:
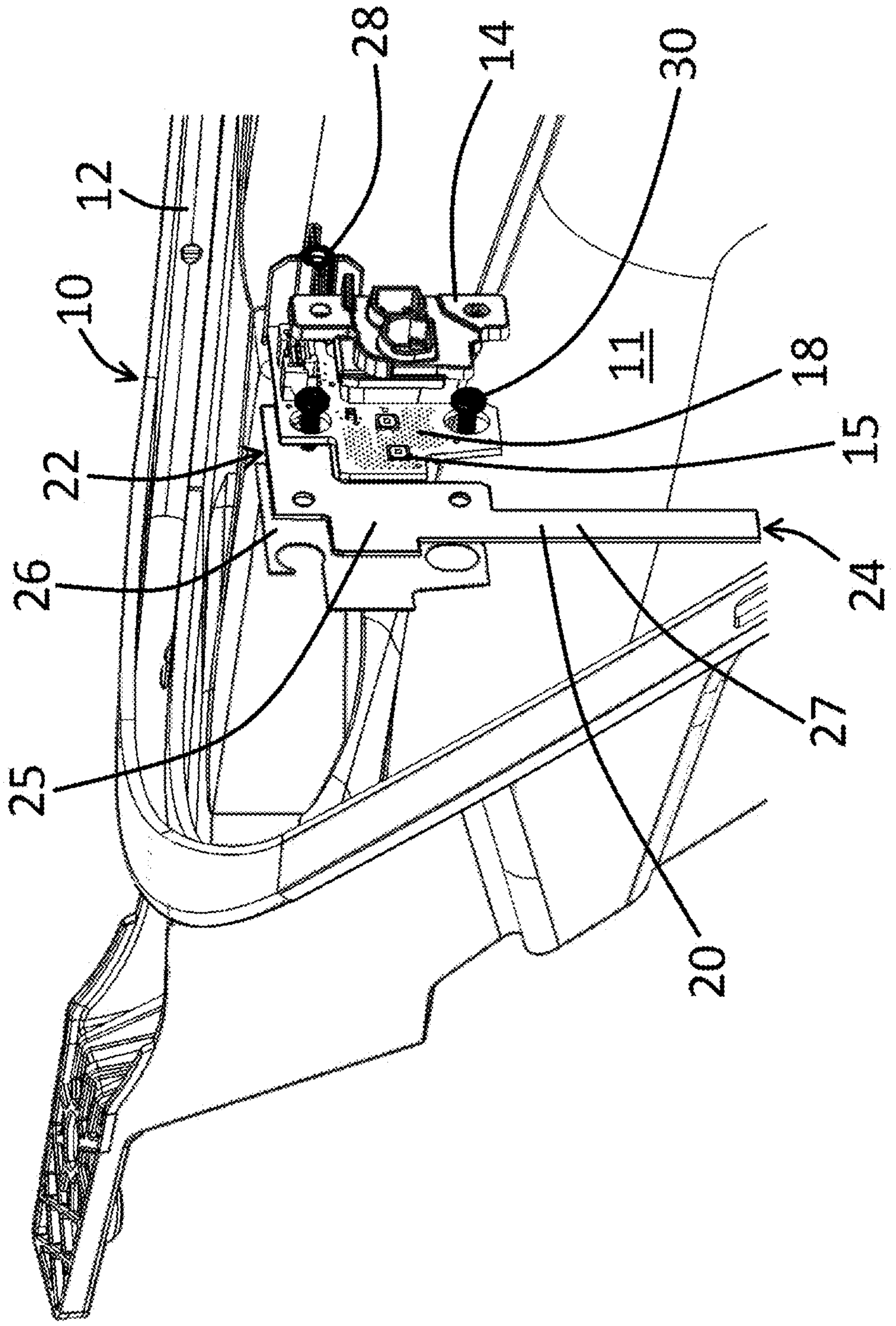
FIG. 1 shows an isometric view of an embodiment of a lamp assembly including a thermal transporter, according to at least one embodiment of the present disclosure.

The present application discloses various embodiments of a lamp assembly including a thermal transporter and methods for using and constructing the same. For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

Improvements in semiconductor materials and in the packaging of microelectronic devices, such as integrated circuits and light-emitting diodes ("LEDs"), have enabled many new applications for these devices but have also resulted in new technical challenges. For example, the efficacy of LEDs has improved to the point that their use in exterior automotive lighting is technically and economically feasible, including for such high light output functions as headlamps. However, one challenge is the need to dissipate significant quantities of heat generated by these newer LEDs, which have ever-increasing power densities. The performance and longevity of LEDs are particularly sensitive to heat because excessive junction temperatures not only limit the light output of an LED but may also shorten its operating life significantly. Therefore, it is critical that heat generated by the LED be transferred away from the LED at a rate great enough to maintain the interface between the different semiconductor materials comprising the LED (i.e., the junction) within an acceptable operating temperature range.

For LED usage in an automotive headlamp, the heat dissipation problem is further compounded by the operating environment of an automotive headlamp, which typically combines exposure to high temperatures from the engine compartment, limited packaging volume due to the space constraints at the front end of an automobile, and a fully enclosed package needed to prevent dust and moisture from degrading the performance of the headlamp. Known solutions, such as conventional heat sinks with large fins or active cooling mechanisms, are costly and bulky and are not practical solutions for an LED headlamp application. The use of cooling fans adds mass, volume, and cost to a headlamp and requires additional power consumption, at least partially negating a primary advantage of using LEDs. Likewise, due in part to the enclosed package of a headlamp, conventional heat sinks must be heavy and bulky to effectively cool the LEDs. Accordingly, a need exists for a means of thermal transport for use with LEDs in a vehicle headlamp that reduces mass, volume, and the need for additional power requirements.

FIG. 1 shows a portion of a lamp assembly 10. The lamp assembly 10 may include a housing 12 attached to a cover (such as an outer lens 13, shown in FIG. 7) to define a volume 11. The lamp assembly 10 may further include a light source 18 disposed within the volume 11 and in thermal communication a thermal transporter 20.

In at least one embodiment, the light source 18 may be one or more light-emitting diodes (LEDs) as shown in FIG. 1. In certain embodiments, the one or more light sources 18 may be either a red, amber, or white LEDs 15 complying with the regulated color requirements of the United States Federal Motor Vehicle Safety Standard 108 or comparable color regulations of other jurisdictions. Other color LEDs 15 may be used as or as part of light sources 18 of the present disclosure, as may be desired.

Though the details of construction vary by manufacturer, an LED 15 generally includes a light-emitting diode chip or die 80 mounted to, but electrically isolated from, a thermally conductive substrate sometimes referred to as a slug 82. The thermal capacitance of the slug 82 is not adequate to maintain the junction temperature of the die 80 within a safe operating range, under even normal operating conditions of supply current and ambient temperature, without additional means for transferring heat from the die 80. Consequently, it is advantageous to thermally connect the slug 82 to an external heat sink to improve the potential rate of heat transfer, and thereby cooling, of the LED 15 die 80. As such, thermal transporter 20 embodiments of the present disclosure can be coupled to, or otherwise in thermal communication with, slugs 82 so to dissipate heat generated by LEDs 15.

The thermal transporter 20 of the present disclosure provides an improved means of heat transfer particularly suited for use in cooling a light source of one or more LEDs 15 within a lamp assembly, such as the light source 18 in the lamp assembly 10. Certain embodiments of the thermal transporter 20 may be useful for transporting heat from the light source 18 where the lamp assembly 10 is an automotive vehicle lamp. Further, the thermal transporter 20 may be useful to cool any heat-generating electronic component, including without limitation microelectronic integrated circuit chips, laser diodes, and the like.

The thermal transporter 20 may include a proximal end 22 in thermal communication with the light source 18 and a distal end 24 extending from the proximal end 22. As shown in FIG. 1, for example, an exemplary thermal transporter can comprise a body portion 25, configured for placement relative to a light source 18, and at least one leg portion 27, extending from the body portion, such that the body portion 25 is at the proximal end 22 and the end of the at least one leg portion 27 is at the distal end 24. In at least one embodiment, the thermal transporter 20 may be configured such that the distal end 24 extends to a region of the volume 11 that is relatively cool compared to the region in and around the light source 18. In certain embodiments of the lamp assembly 10, the relatively cool region may be below the light source 18 due to the buoyancy effect that generally lifts warmer air circulating within the volume 11 to regions above the light source 18. Alternatively, the relatively cool region may be a region of the lamp assembly 10 that is substantially lateral to the light source 18 but at least partially partitioned from the region including the light source 18. For example, the volume 11 of the lamp assembly 10 may include multiple cavities or compartments partitioned from one another by walls, ribs, inner lenses, and the like. In such an embodiment, the thermal transporter 20 may extend between cavities and compartments such that the distal end 24 extends to a relatively cool region of the volume 11. In at least one embodiment, the distal end 24 may extend outside the volume 11 to dissipate heat to the environment external to the lamp assembly 10. In such an embodiment, the thermal transporter 20 may extend through the housing 12 or the lens.

Figure 4A:
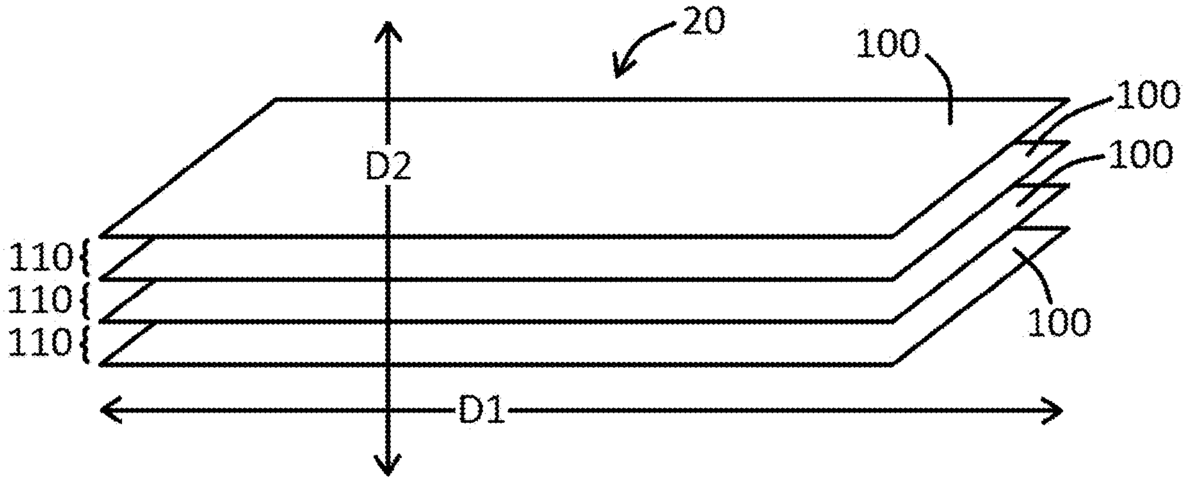
FIG. 4A shows a perspective view several graphite sheets of a thermal transporter positioned relative to one another, according to at least one embodiment of the present disclosure.
Figure 5:
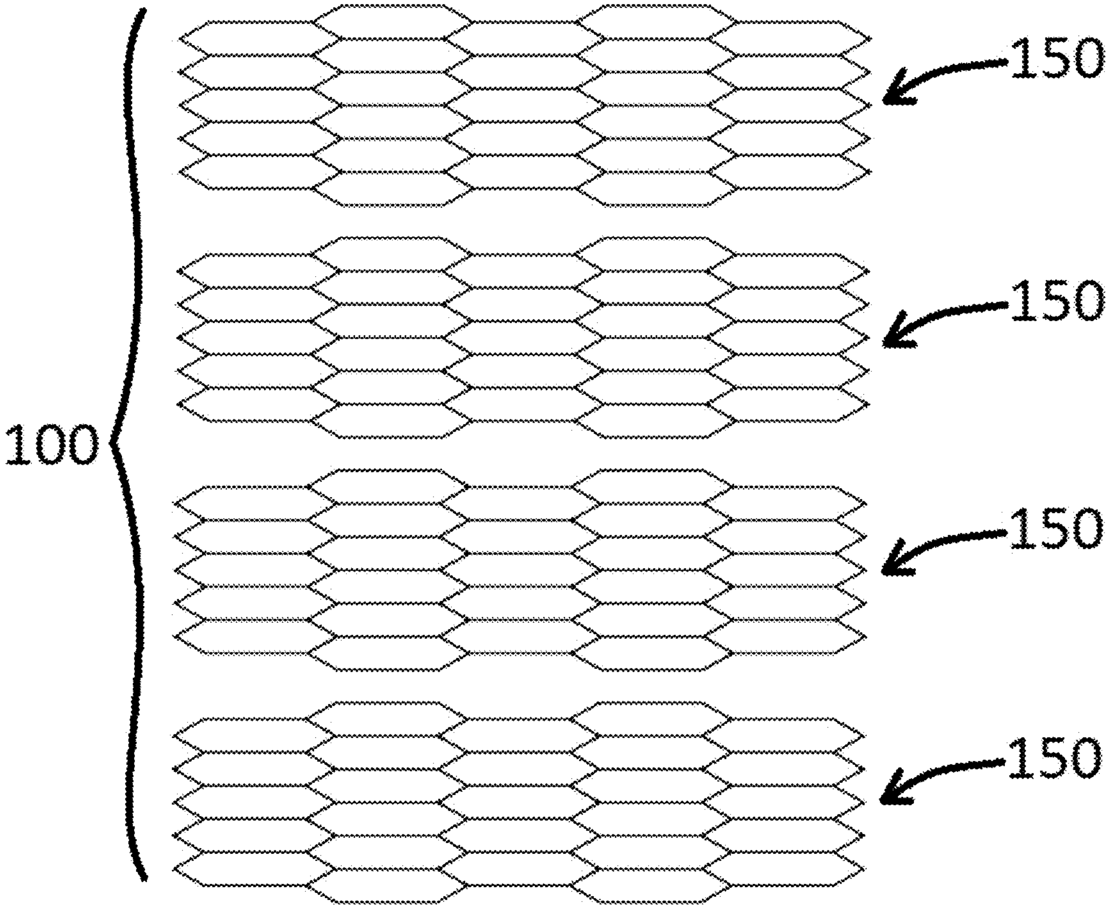
FIG. 5 shows a perspective view of plurality of graphene layers of a graphite sheet of a thermal transporter, according to at least one embodiment of the present disclosure.

In at least one embodiment according to the present disclosure, the thermal transporter 20 may include a plurality of graphite sheets 100, such as shown in FIG. 4A, structured to transfer heat from the light source 18. Each graphite sheet 100 may be formed of graphite flakes containing hexagonal arrays of carbon atoms in planar layers often referred to as graphene layers. Exemplary graphene layers 150 are shown in FIG. 5, depicted as hexagonal arrays of carbon atoms. The planar graphene layers 150 of the graphite sheets 100 may be formed substantially parallel to one another, such as shown in FIG. 4A, held together by only weak Van der Waals forces, which enables the graphite sheets 100 to be separated from and move relative to one another.

Figure 4B:
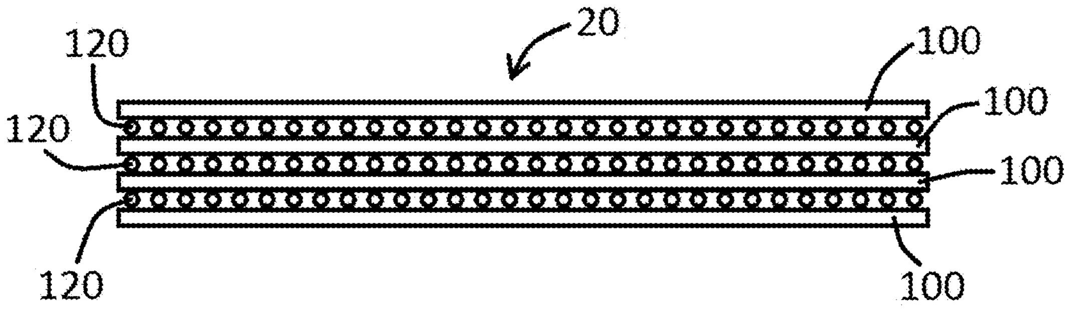
FIG. 4B shows a side view of several graphite sheets of a thermal transporter positioned relative to one another with intercalation ions positioned therebetween, according to at least one embodiment of the present disclosure.

Because of the layered structure of the graphite sheets 100, the thermal transporter 20 is highly anisotropic, meaning its properties are directionally dependent. For instance, the thermal conductivity of the thermal transporter 20 is significantly greater in a direction parallel to the plane of the graphite sheets 100 than in a direction perpendicular thereto (i.e., between graphite sheets). As shown in FIG. 4, direction D1 is shown in a direction parallel to a plane of a graphite sheet 100, and direction D2 is shown in a direction perpendicular to a plane of a graphite sheet 100. Specifically, the thermal conductivity of the thermal transporter 20 may be 140-500 W/mK in the direction parallel (D1) to the plane of the graphite sheets 100, and only 3-10 W/mK in a direction perpendicular (D2) to the plane of the graphite sheets 100. In contrast, conventional thermally conductive and isotropic materials such as copper and aluminum have roughly the same thermal conductivity in all three directions (in relative x, y, and z axes). Due to its highly anisotropic thermal conductivity, exemplary thermal transporters 20 of the present disclosure enable relatively high heat transfer in the parallel plane (direction D1) of the graphite sheets 100 and relatively high thermal resistance (i.e., insulation) in the perpendicular direction (D2) between graphite sheets 100. Further, the layered structure of the graphite sheets 100, such as shown in FIGS. 4A and 4B, provide the thermal transporter 20 with flexibility to confirm to a desired surface under relatively low contact pressure.

Figure 6:
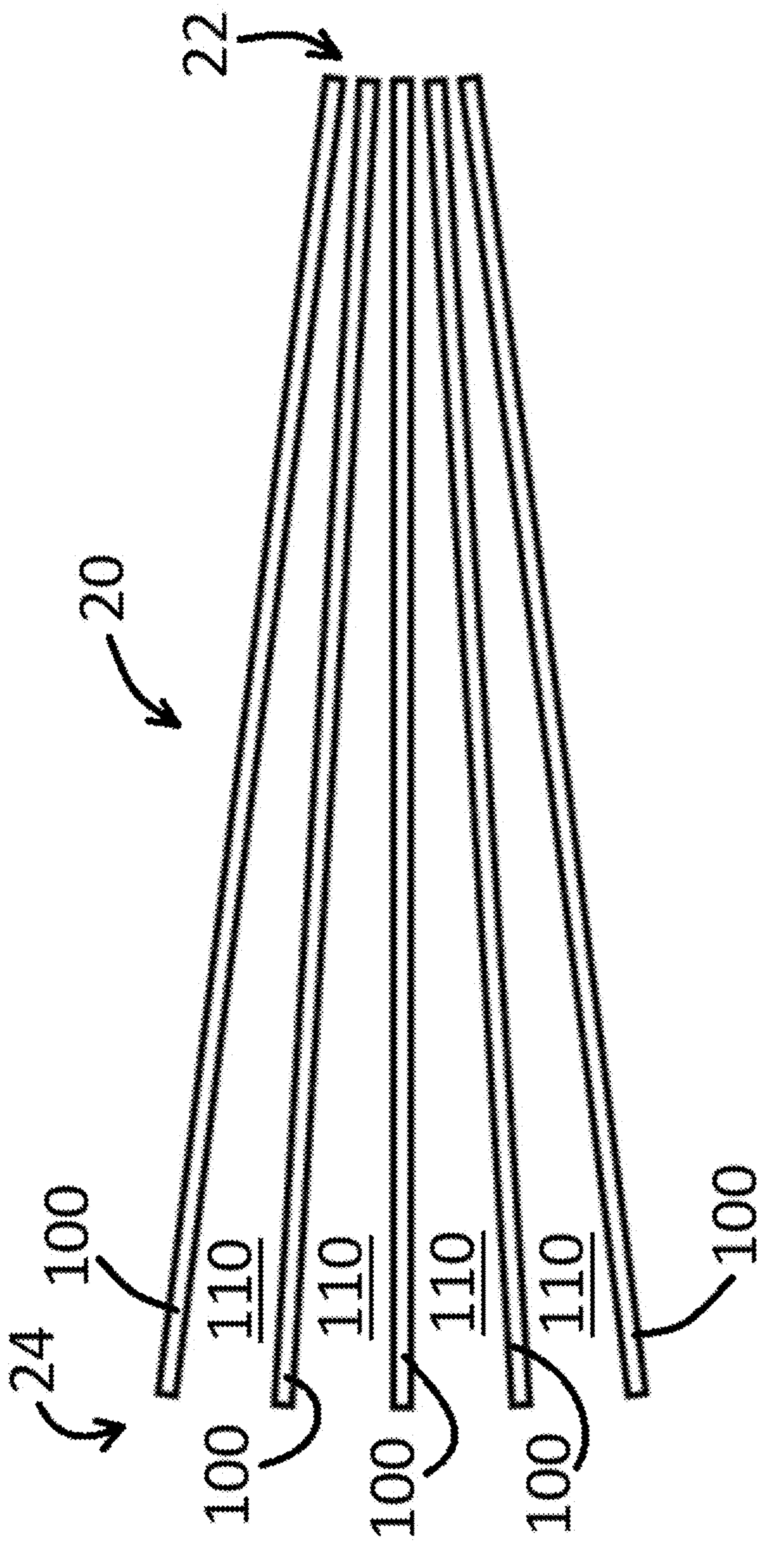
FIG. 6 shows a perspective view several graphite sheets of a thermal transporter positioned relative to one another, having smaller spaces at the proximal end and larger spaces at the distal end, according to at least one embodiment of the present disclosure.
Figure 8:
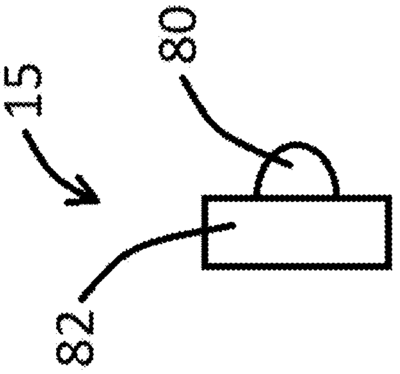
FIG. 8 shows a light-emitting diode, according to at least one embodiment of the present disclosure.

In certain embodiments, the separation between the graphite sheets 100 of the thermal transporter 20, and thus its anisotropic thermal conductivity, may be enhanced by the insertion of an intercalant ion into the space 110, as shown in FIG. 4A, between the graphene layers 100, via a process referred to as intercalation. FIG. 4B shows an exemplary thermal transporter 20 of the present disclosure comprising a plurality of graphene sheets 100 and intercatant ions 120 positioned in between the graphene sheets 100 (namely within the spaces 110 between graphene sheets 100). The intercalant ions 120 may then be vaporized and driven from the space 110 in a process referred to as exfoliation. The spacing between the graphene layers 100 (i.e., perpendicular to the plane of the layer, as shown in FIGS. 4A and 4B) of the resulting exfoliated graphite flakes may be 100 or more times greater than the original graphene layers 100. In certain embodiments, such as shown in FIG. 6, the thermal transporter 20 may be structured such that separation between the graphite sheets 100 of the proximal end 22 is lesser than that of the distal end 24 to facilitate conduction of heat into the thickness of the thermal transporter 20 prior to facilitating transfer along the graphite sheets.

Figure 2:
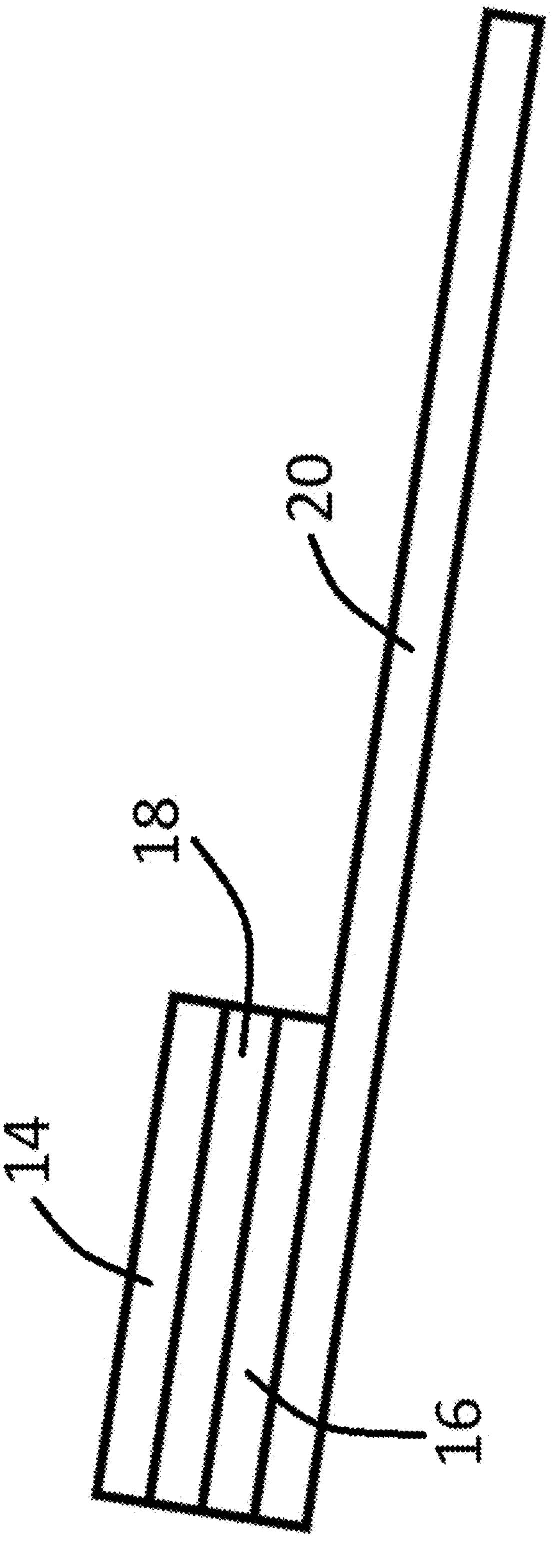
FIG. 2 shows an isometric view of detailed portion of an embodiment of a thermal transporter, according to at least one embodiment of the present disclosure.

Referring back to FIG. 1, in embodiments in which the light source 18 is one or more LEDs 15, the lamp assembly 10 may further include a circuit board 16 disposed between the light source 18 and the thermal transporter 20, such as shown in FIG. 2. In such an embodiment, the one or more LEDs 15 may be mounted to the circuit board 16 to provide electrical connections to a power source and/or a controller (not shown) and to provide a thermal connection between the light source 18 and the thermal transporter 20, which may be attached to the circuit board 16. The thermal transporter 20 may be attached to the circuit board 16 by any suitable means of generating a solid and secure thermal communication therebetween, including one or more fasteners 30, adhesive, thermal conductive grease, combinations thereof, and the like. In certain embodiments, the circuit board 16 may be a printed circuit board, a film, or any other suitable means to enabling electrically connection to the light source 18.

The lamp assembly 10 may further include a carrier 26 structured to support at least the proximal end 22 of the thermal transporter 20. The carrier 26 may further support the thermal transporter 20 at a location where the thermal transporter 20 is mounted to the housing 12. In certain embodiments, the carrier 26 may be made of an insulating material to thermal insulate the thermal transporter 20 from the housing 12.

Figure 7:
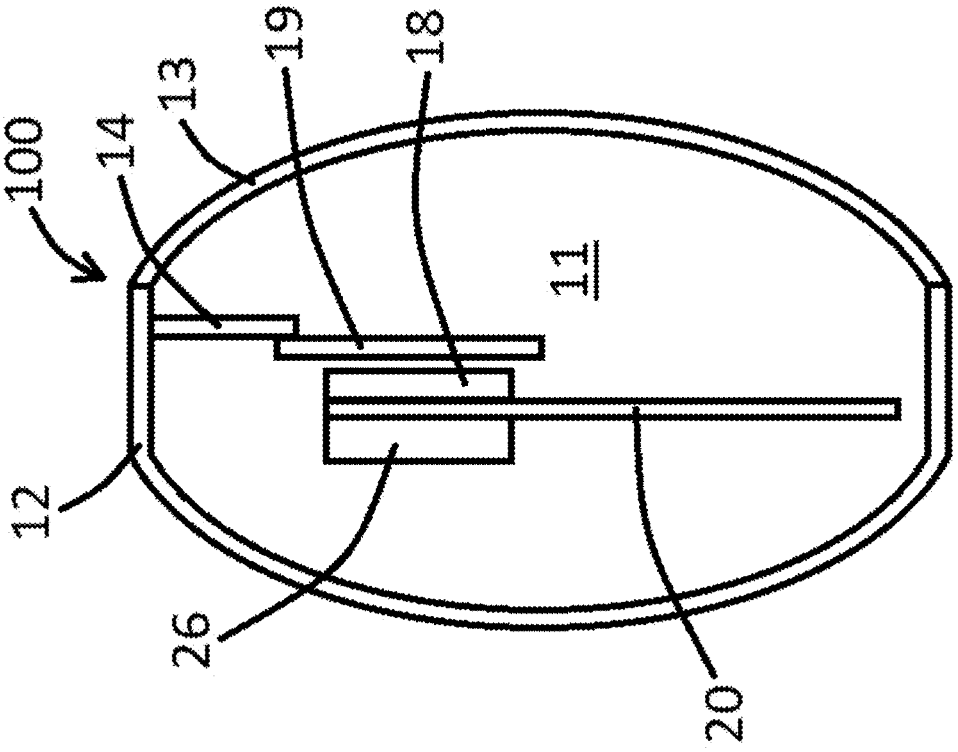
FIG. 7 shows a side view of a lamp assembly having a thermal transporter positioned therein, according to at least one embodiment of the present disclosure.

The lamp assembly 10 may further include a lens holder 14, which may be mounted in relation to the light source 18 to securely position an inner lens 19, such as shown in FIG. 7. In certain embodiments, the inner lens 19 may be a collimating lens to direct light emitted by the light source 18 in a desired light distribution. Alternatively, the inner lens 19 may be a light pipe or light guide configured to direct light emitted by the light source 18 to be emitted indirectly from a different location within the lamp assembly 10.

FIG. 2 shows an embodiment of the thermal transporter 20 attached to the circuit board 16 including three LEDs 15 for light source 18 behind the lens holder 14. The dimensions of the thermal transporter 20 may depend upon the wattage of thermal energy to be transferred in a given application. Specifically, the thickness (i.e., perpendicular to the plane of the graphite sheets) of the thermal transporter 20 may be any suitable dimension. In at one embodiment, the thermal transporter 20 may be between 0.1 and 1.0 mm thick. In certain embodiments, thermal transporter 20 may be between 0.4 and 0.5 mm thick. The width of the thermal transporter 20 may be between 10 and 50 mm. In certain embodiments, thermal transporter 20 may be between 25 and 30 mm in width. The length of the thermal transporter 20 may be any suitable dimension as needed to transfer heat from the light source 18 to a relatively cool region of the volume 11. Further, the form factor of the thermal transporter 20 may include any suitable shape. As shown in FIG. 2, the thermal transporter 20 may include curved or bent sections, due to its flexibility, such that the distal end extends to the desired region of the volume 11. The shape of the thermal transporter 20 may include one or more extensions in any direction.

The thermal transporter 20 uses conductive heat transfer to draw heat from the light source 18 and to transport that heat from the proximal end 22 to the distal end 24. The thermal transporter 20 further uses convective heat transfer, driven by the buoyance effect of a temperature gradient, to dissipate the transported heat to the internal atmosphere of the volume 11. Though the thermal transport 20 may dissipate heat via convection along its entire length and width, convective heat transfer is greatest in the presence of a greater temperature difference. Accordingly, as the distal end 24 extends into a relatively cool region of the volume 11, the degree of heat dissipation from the thermal transporter to the internal atmosphere may increase.

Figure 3:
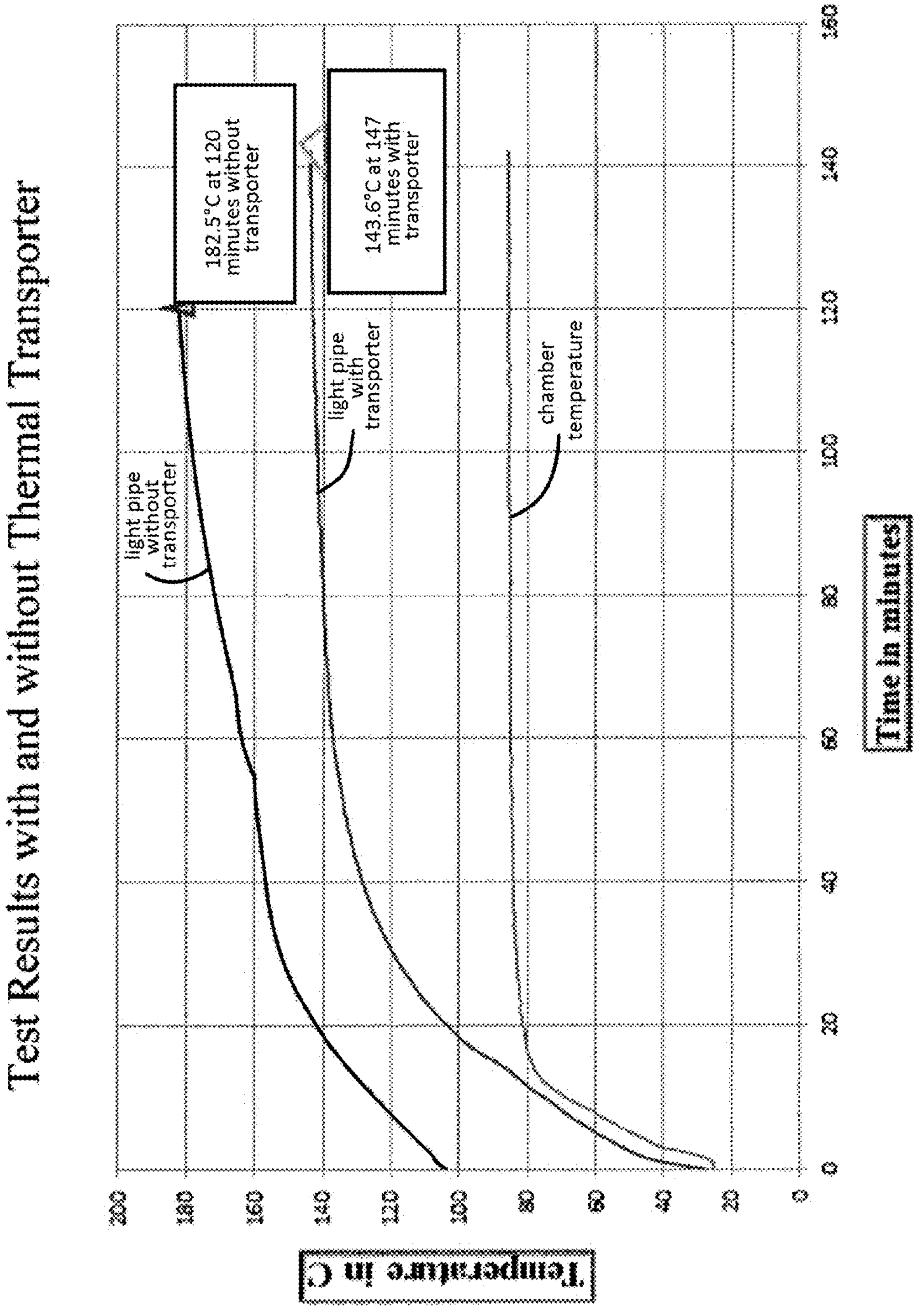
FIG. 3 shows plot of operating temperature in degrees Celsius (° C.) versus time in minutes (min.) for different embodiments of a lamp assembly, according to at least one embodiment of the present disclosure.

FIG. 3 illustrates an experiment comparing two different test lamp assemblies 10 using the same light source 18 energized continuously and operated in a heated environment of approximately 85° C. In each trial, a thermocouple was placed near the light source 18 on the lens holder 14. In one trial, the lens holder 14 of a test lamp assembly that did not include the thermal transporter 20 reached a steady-state temperature of approximately 183° C. In a separate trial, the lens holder 14 of a test lamp assembly that did include the thermal transporter 20 reached a steady-state temperature of only approximately 144° C., thereby demonstrating the ability of thermal transporter 20 to reduce the operating temperature of light source 18.

While various embodiments of a lamp assembly including a thermal transporter and methods for using and constructing the same have been described in considerable detail herein, the embodiments are merely offered by way of non-limiting examples of the disclosure described herein. It will therefore be understood that various changes and modifications may be made, and equivalents may be substituted for elements thereof, without departing from the scope of the disclosure. Indeed, this disclosure is not intended to be exhaustive or to limit the scope of the disclosure.

Further, in describing representative embodiments, the disclosure may have presented a method and/or process as a particular sequence of steps. However, to the extent that the method or process does not rely on the particular order of steps set forth herein, the method or process should not be limited to the particular sequence of steps described. Other sequences of steps may be possible. Therefore, the particular order of the steps disclosed herein should not be construed as limitations of the present disclosure. In addition, disclosure directed to a method and/or process should not be limited to the performance of their steps in the order written. Such sequences may be varied and still remain within the scope of the present disclosure.

The invention claimed is:

1. An assembly, comprising:

a light source; and a thermal transporter in communication with the light source, the thermal transporter comprising a plurality of graphene sheets having empty spaces therebetween and along the entire lengths of the plurality of graphene sheets, and wherein the spaces are relatively smaller at a proximal end of the plurality of graphene sheets and are relatively larger at a distal end of the plurality of graphene sheets, and wherein the empty spaces continually increase in a distal direction along the entire lengths of the plurality of graphene sheets.

2. The assembly of claim 1, further comprising:

a cover attached to a housing defining a volume;

wherein the thermal transporter is further structured to dissipate the transferred heat to a relatively cool portion of the volume.

3. The lamp assembly of claim 2, wherein a proximal end of the thermal transporter is in thermal contact with the light source and wherein a distal end of the thermal transporter extends into the relatively cool portion of the volume.

4. The lamp assembly of claim 1, wherein the cover comprises a lens configured to allow light from the light source to travel therethrough.

5. The lamp assembly of claim 1, wherein the plurality of graphene sheets exhibit a relatively high thermal conductivity in a plane substantially parallel with the plurality of graphene sheets and a relatively low thermal conductivity in a direction substantially perpendicular with the plane.

6. The lamp assembly of claim 1, wherein the lamp assembly further comprises a circuit board in thermal contact with the thermal transporter, wherein the light source is attached to the circuit board.

7. The lamp assembly of claim 1, configured as an automotive headlamp.

8. The lamp assembly of claim 1, wherein the light source comprises at least one light-emitting diode comprising a die coupled to a slug.

9. The lamp assembly of claim 1, wherein the thermal transporter comprises a body portion and at least one leg portion, the body portion positioned at a proximal end of the thermal transporter and configured for placement at or near the light source so to be in thermal communication with the light source, and the at least one leg portion extending from the body portion to a distal end of the thermal transporter, the distal end located away from the light source.

10. A lamp assembly, comprising:

a fully enclosed volume;

a thermal transporter in the volume, the thermal transporter comprising a plurality of graphene sheets having a proximal end, a distal end, and empty spaces therebetween and along the entire lengths of the plurality of graphene sheets, and in communication with a light source;

wherein the spaces are relatively smaller at the proximal end and are relatively larger at the distal end;

wherein the thermal transporter terminates in the volume.

11. The assembly of claim 10, further comprising:

a cover attached to a housing defining the volume; and the thermal transporter in thermal communication with the light source;

wherein the thermal transporter is further structured to dissipate the transferred heat to a relatively cool portion of the volume.

12. The lamp assembly of claim 11, wherein a proximal end of the thermal transporter is in thermal contact with the light source and wherein a distal end of the thermal transporter extends into the relatively cool portion of the volume.

13. The lamp assembly of claim 10, wherein the cover comprises a lens configured to allow light from the light source to travel therethrough.

14. The lamp assembly of claim 10, wherein the plurality of graphene sheets exhibit a relatively high thermal conductivity in a plane substantially parallel with the plurality of graphene sheets and a relatively low thermal conductivity in a direction substantially perpendicular with the plane.

15. The lamp assembly of claim 10, configured to fit within a housing having a lens attached thereto, the housing configured as a lamp housing.

16. The lamp assembly of claim 10, further comprising intercalation ions positioned in between at least two graphene sheets of the plurality of graphene sheets.

17. A lamp assembly comprising:

a cover attached to a housing defining a fully enclosed volume; and a thermal transporter in thermal communication with a light source;

wherein the thermal transporter and the light source are positioned within the volume;

wherein the thermal transporter comprises a plurality of graphene sheets;

wherein a distal end of the thermal transporter terminates in the volume such that the distal end of the thermal transporter floats in a relatively cool portion of the volume.

18. The lamp assembly of claim 17, wherein a proximal end of the thermal transporter is in thermal contact with the light source.

19. The lamp assembly of claim 17, wherein the thermal transporter comprises a body portion and at least one leg portion, the body portion positioned at a proximal end of the thermal transporter and configured for placement at or near the light source so to be in thermal communication with the light source, and the at least one leg portion extending from the body portion to a distal end of the thermal transporter, the distal end located away from the light source.

* * * * *